United States Patent
Chou

(10) Patent No.: US 7,787,418 B2
(45) Date of Patent: Aug. 31, 2010

(54) APPARATUS AND METHOD TO SUPPORT VOIP CALLS FOR MOBILE SUBSCRIBER STATIONS

(75) Inventor: Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 719 days.

(21) Appl. No.: 11/760,103

(22) Filed: Jun. 8, 2007

(65) Prior Publication Data

US 2008/0304445 A1    Dec. 11, 2008

(51) Int. Cl.
H04W 4/00    (2009.01)
(52) U.S. Cl. .................. 370/329; 370/328; 370/338; 370/401; 455/450; 455/452.2
(58) Field of Classification Search ............. 370/328, 370/329, 338; 455/450, 452.2, 509
See application file for complete search history.

(56) References Cited

U.S. PATENT DOCUMENTS

| | | | |
|---|---|---|---|
| 6,708,207 B1 * | 3/2004 | Sabelhaus et al. ........... | 709/223 |
| 7,305,240 B2 * | 12/2007 | Chou et al. ................. | 455/450 |
| 7,339,913 B2 * | 3/2008 | Chou et al. ................. | 370/338 |
| 7,369,856 B2 * | 5/2008 | Ovadia ....................... | 455/439 |
| 7,522,570 B2 * | 4/2009 | Kim et al. ................... | 370/338 |
| 7,616,962 B2 * | 11/2009 | Oswal et al. ............. | 455/452.2 |
| 7,656,890 B2 * | 2/2010 | Chapman et al. ............ | 370/431 |
| 2005/0063330 A1 | 3/2005 | Lee et al. | |
| 2005/0185656 A1 * | 8/2005 | Svensson et al. ............ | 370/398 |
| 2005/0239465 A1 * | 10/2005 | Lee et al. .................... | 455/436 |
| 2006/0111111 A1 | 5/2006 | Ovadia | |
| 2007/0160017 A1 * | 7/2007 | Meier et al. ................. | 370/338 |
| 2007/0206561 A1 * | 9/2007 | Son et al. .................... | 370/346 |

(Continued)

FOREIGN PATENT DOCUMENTS

EP    1753188 A1    2/2007

OTHER PUBLICATIONS

Lee et al., "An Enhanced Uplink Scheduling Algorithm Based on Voice Activity for VoIP Services in IEEE 802.16d/e Systems," IEEE communication letters, vol. 9, No. 8, Aug. 2005, pp. 691-693, See the abstract and pp. 691-692.
Chen et al., "Providing Integrated QoS Control for IEEE 802.16 Broadband Wireless Access Systems," IEEE 2005, pp. 1254-1258, See pp. 1255-1256 and figures 1, 2.

(Continued)

*Primary Examiner*—Sharad Rampuria
(74) *Attorney, Agent, or Firm*—Schwabe, Williamson & Wyatt, P.C.

(57) ABSTRACT

In some embodiments, a base station includes a service flow management module having an admission control module and a data path function module in communication with the admission control module. The data path function module is adapted to generate a first dynamic service addition (DSA) request message for a first uplink service flow in an active state to provide voice over internet protocol (VoIP) signaling. the admission control module, in response to the admission control module determining that a second uplink service flow in an admitted state for a VoIP call can be supported, is adapted to generate an admit signal, with the first and the second uplink service flows being substantially in accordance with an Institute of Electrical and Electronic Engineers (IEEE) 802.16 standard. The data path function module, in response to the admit signal, is further adapted to generate a second DSA request message for the second uplink service flow, with the second DSA message containing an amount of a reserved bandwidth for the VoIP call.

30 Claims, 9 Drawing Sheets

U.S. PATENT DOCUMENTS

2008/0107084 A1* 5/2008 Pichna et al. .............. 370/332
2008/0232267 A1* 9/2008 Kim et al. .................. 370/252
2008/0273520 A1* 11/2008 Kim et al. .................. 370/345
2008/0311941 A1* 12/2008 Yanover ..................... 455/509
2009/0040983 A1* 2/2009 Kim et al. .................. 370/331
2009/0137254 A1* 5/2009 Vukovic et al. ........... 455/452.1
2009/0141677 A1* 6/2009 Maas ......................... 370/329

OTHER PUBLICATIONS 802.16, IEEE Standard for Local and metropolitan area networks, Part 16: Air Interface for Fixed Broadband Wireless Access Systems, IEEE Computer Society and the IEEE.

Microwave Theory and Techniques Society, Revision of IEEE Standard 802.16-2001, Oct. 1, 2004, pp. 218-228.

* cited by examiner

US 7,787,418 B2

APPARATUS AND METHOD TO SUPPORT VOIP CALLS FOR MOBILE SUBSCRIBER STATIONS

BACKGROUND

1. Technical Field

Embodiments of the present invention are related to the field of electronic devices, and in particular, to communication devices.

2. Description of Related Art

A broadband wireless access (BWA) system provides a point-to-multipoint communication system in a communications network. BWA systems typically use microwave and millimeter wave technology to transmit communication signals from a wireless base station (BS) to one or more subscriber stations (SS) and/or mobile subscriber stations (MS). A BWA system may be a converged wireless network designed to provide voice, video, and data services. An 802.16 family of standards were developed by the Institute of Electrical and Electronic Engineers (IEEE) to provide for fixed, portable, and/or mobile BWA networks (e.g., the IEEE std. 802.16, published 2004 and subsequent revisions). The Worldwide Interoperability for Microwave Access (WiMAX) forum facilitates the deployment of broadband wireless networks based on the IEEE 802.16 standard. In particular, the WiMAX forum ensures the compatibility and inter-operability of broadband wireless equipment. For convenience, the terms "802.16" and "WiMAX" may be used interchangeably throughout this disclosure to refer to the IEEE 802.16 suite of air interface standards.

In downlink transmissions, WiMAX networks may broadcast data packets from BS to SS or MS; whereas in the uplink transmissions, the scheduling services may be designed to support services with different traffic characteristics and Quality of Service (QoS) requirements. A significant benefit of the converged wireless networks, such as a WiMAX network, is in the sharing of the most valuable resources—the wireless spectrum among different services. However, the wireless network convergence in a WiMAX network also comes with some challenges, due to the arbitration of uplink transmission between multiple SSs, as well as the allocation of uplink bandwidth with QoS needed for different services.

DETAILED DESCRIPTION OF ILLUSTRATIVE EMBODIMENTS

In the following description, for purposes of explanation, numerous details are set forth in order to provide a thorough understanding of the disclosed embodiments of the present invention. However, it will be apparent to one skilled in the art that these specific details are not required in order to practice the disclosed embodiments of the present invention. In other instances, well-known electrical structures and circuits are shown in block diagram form in order not to obscure the disclosed embodiments of the present invention. The term "coupled" shall encompass a direct connection, an indirect connection or an indirect communication.

Figure 1:
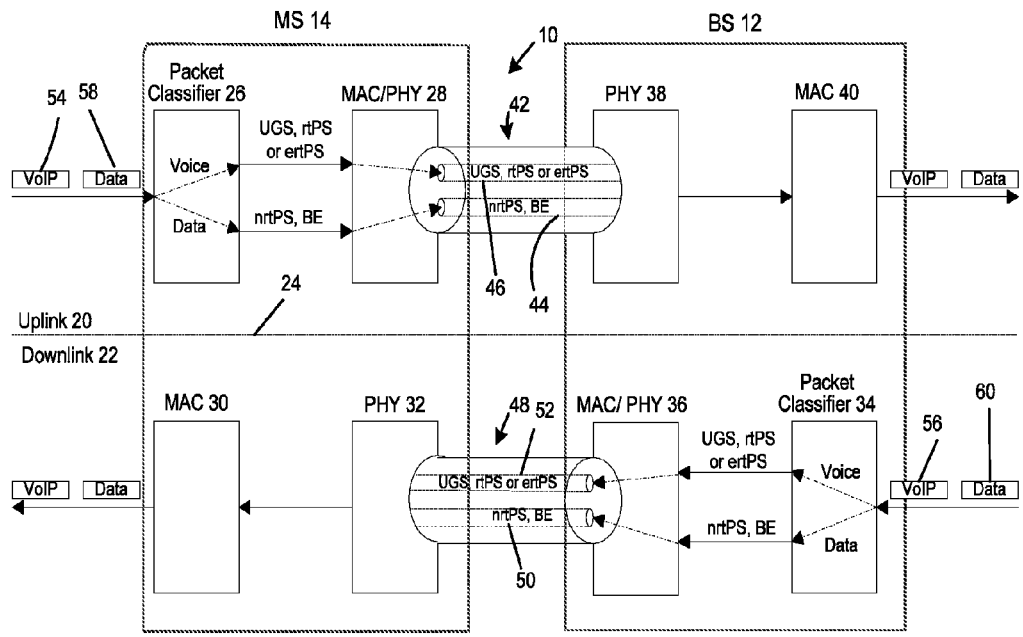
FIG. 1 is a block drawing of a BWA system, according to various embodiments of the present invention.

With reference to FIG. 1, an illustrative Broadband Wireless Access (BWA) system 10 is shown, according to the various embodiments of the present invention. The BWA system 10 may use wireless cells to cover geographic areas. The BWA system 10 may include a base station (BS) 12 at a central site location transmitting to a plurality of mobile subscriber stations (mobile SSs) or mobile stations (MSs) 14 at remote site locations (only one MS 14 is illustrated in FIG. 1). Examples of MS 14 may include laptops or Ultra Mobile Devices (UMD), such as handheld devices. Elements of the BWA system 10 may communicate with each other in accordance with the communication protocol of the IEEE 802.16 standard. In general, this 802.16 standard may define wireless broadband access for fixed and/or mobile SSs (such as MS 14) in a wireless Metropolitan Area Network (MAN), which may also be referred to as a WiMAX network. The BS 12 and MSs 14 communicate over a wireless medium (air interface) 16 of a wireless cell for the BS 12. The BS 12 may collect traffic to and from the MSs 14 within the cell. The BS 12 may include equipment having an interface to a wired or wireless backbone network (not shown), such as the Internet; thereby providing a link between a given MS 14 and the backbone network.

The MSs 14 may generate and receive Voice over Internet Protocol (VoIP) calls. In one embodiment, the BWA system 10 may use a Session Initiation Protocol (SIP) for VoIP call sessions. SIP is an application-layer control (signaling) protocol for creating, modifying, and terminating sessions with one or more MS 14 (see Request For Comments (RFC) 3261 specification from the Internet Engineering Task Force (IETF) SIP Working Group). However, protocols other than SIP may be used for VoIP call sessions. The BWA system may be configured to transport VoIP traffic originating from or received by the MS 14 over a connection with differentiated Quality of Service (QoS) tailored for voice services. A description of the relevant portions of the IEEE 802.16 standard and various definitions will now be provided, which are useful in understanding the various embodiments according to the present invention.

IEEE 802.16 defines a "service flow" as a Media Access Control (MAC) transport service that provides unidirectional transport of packets, either uplink packets transmitted by the SS or downlink packets transmitted by the BS. A service flow is characterized by a set of QoS Parameters, such as latency, jitter, and throughput assurances. The BS provides a given QoS according to the QoS Parameter Set defined for the service flow. Generally, a service flow, as described in the IEEE 802.16 standard, may have three states (each service flow can transition to any of the three states): (a) Provisioned—this state of service flow is known via provisioning by, for example, a network management system; (b) Admitted—this state of service flow has resources reserved by the BS for the SS; and (c) Active—this state of service flow has resources committed by the BS for the SS. IEEE 802.16 includes a parameter QoS Parameter Set Type ("Set Type parameter") within each service flow encoding which specifies the proper application of the QoS Parameter Set: to the Provisioned Set, the Admitted Set, and/or the Active Set. The 802.16 standard proposes a two-phase Activation Model, wherein resources, such as bandwidth, are first "admitted" and then once the end-to-end negotiations are completed, the resources are "activated". IEEE 802.16 also defines a DSA (Dynamic Service Addition) message, a DSC (Dynamic Service Change) message, and a DSD (Dynamic Service Deletion) message that may be used to create, change and delete, respectively, service flows dynamically, as VoIP call connections are set-up or torn-down.

IEEE 802.16 (WiMAX) also defines uplink scheduling services using bandwidth request/grant process to differentiate QoS requirements. The following are service classes of IEEE 802.16 for various services: (a) Unsolicited Grant Services (UGS): support constant bit rate (CBR) or CBR like service flows, such as T1/E1 emulation, and VoIP without silence suppression; (b) Real-Time Polling Services (rtPS): support real-time service flows (SFs) that generate variable size data packets on a periodic basis, such as Voice over IP services without silence suppression: (c) Extended Real-Time Polling Services (ertPS): support real-time service flows that generate variable size data packets on a periodic basis, such as Voice over IP (VoIP) services with silence suppression; (d) Non-Real-Time Polling Services (nrtPS): support non-real-time SF that needs variable size data grant burst type on a regular basis, such as File Transfer Protocol (FTP), and HyperText Transfer Protocol (HTTP); and (e) Best Effort Services (BE): support typical web surfing and email services. Each service class includes a grouping of service flow properties or attributes (including QoS parameters) used by the MS 14 or BS 12 to request service flows with desired QoS.

Access Service Network (ASN) is defined as a set of network functions needed to provide radio access to a WiMAX subscriber (e.g., MS 14). The ASN may provide the following functions: (a) WiMAX Layer-2 (L2) connectivity with WiMAX MS (e.g., MS 14); (b) transfer of Authentication, Authorization and Accounting (AAA) messages to WiMAX subscriber's Home Network Service Provider (H-NSP) for authentication, authorization and session accounting for subscriber sessions; (c) network discovery and selection of the WiMAX subscriber's preferred NSP; (d) relay functionality for establishing Layer-3 (L3) connectivity with a WiMAX MS (i.e. IP address allocation); and radio resource management. In addition to the above functions, for a portable and mobile environment, an ASN may support the following functions: (a) ASN anchored mobility; (b) Connectivity Service Networks (CSN) anchored mobility; (c) paging; and (d) ASN-CSN tunneling. ASN may include network elements such as one or more BSs 12, and one or more ASN Gateways. An ASN may be shared by more than one CSN.

Connectivity Service Network (CSN) is defined as a set of network functions that provide Internet Protocol (IP) connectivity services to the WiMAX subscriber(s). A CSN may provide the following functions: (a) MS IP address and end-point parameter allocation for user sessions; (b) Internet access; (c) AAA proxy or server; (d) Policy and Admission Control based on user subscription profiles; (e) ASN-CSN tunneling support; (f) WiMAX subscriber billing and inter-operator settlement; Inter-CSN tunneling for roaming; and (h) Inter-ASN mobility; and WiMAX services such as location based services, connectivity for peer-to-peer services, provisioning, authorization and/or connectivity to IP multi-media services and facilities to support lawful intercept services. CSN may include network elements such as routers, AAA proxy/servers, user databases, and interworking gateway MSs.

Authentication, authorization and accounting (AAA) service performs user authentication, user authorization and user accounting functions. In some embodiments, Remote Authentication Dial-In User Service (RADIUS) protocol may be used as the communication protocol for carrying AAA information. RADIUS is an Internet standard track protocol for carrying authentication, authorization, accounting and configuration information between devices that desire to authenticate their links and a shared AAA or AAA proxy service. IEEE 802.16e utilizes an Extensible Authentication Protocol (EAP) in key exchanges between the supplicant and authenticator and may use a number of keys. The starting point of may be a pairwise master key (PMK), with the PMK coming from the authentication server.

Referring back to FIG. 1, an overview block schematic diagram is shown which is representative of the BS 12 and one of the MS 14 of the BWA system 10, in accordance with various embodiments of the present invention. Although only one MS 14 is shown, the BS 12 may accommodate a plurality of MSs 14 (mobile SSs 14). The BS 12 and MS 14 conceptually are divided into an uplink portion 20 and a downlink portion 22 by an imaginary line 24. Functional units of the BS 12 and MS 14 may conform to the layers of the Opens Systems Interconnect (OSI) model, including the media access control (MAC) layer and the physical (PHY) layer, with the layers being divided into uplink and downlink portions 20 and 22. Hence, the MS 14 may be illustrated with a packet classifier 26 coupled to uplink MAC/PHY layer portions 28 and a downlink MAC layer portion 30 and a downlink PHY layer portion 32. Likewise, the BS 12 may be illustrated with a packet classifier 34 coupled to downlink MAC/PHY layer portions 36. The BS 12 also may include an uplink PHY layer portion 38 and an uplink MAC layer portion 40. As will be described hereinafter, the packet classifiers 26 and 34 route the packets to the appropriate virtual connections, based on classification rules.

FIG. 1 illustrates how VoIP and data (e.g., Internet data) may be transported in the converged WiMAX network of the BWA system 10. Service flows are virtual connections over the air interface 16. More specifically, a conceptual transmission pipe 42 is illustrated between the uplink MAC/PHY layers 28 of the MS 14 and the uplink PHY layer portion 38 of the BS 12, with this pipe being illustrated with a first uplink service flow 44 for VoIP signaling and a second uplink service flow 46 for a VoIP call (call's VoIP packets), as will be described in detail hereinafter. Likewise, a conceptual transmission pipe 48 is illustrated between the downlink MAC/PHY layer portions 36 of the BS 12 and the downlink PHY layer portion 22 of the MS 14, with this pipe being illustrated with a first downlink service flow 50 for VoIP signaling and a second downlink service flow 52 for a VoIP call (VoIP connection carrying the call's VoIP packets). The packet classifier 26 in the MS 14 may classify and route the uplink VoIP packets 54 to the uplink second service flow 46 toward the BS 12, while the packet classifier 34 in the BS 12 may classify and route the downlink VoIP packets 56 to the second downlink service flow 52 toward the MS 14. Likewise, uplink data 58 may be classified by the packet classifier 26 and routed to the first uplink service flow 44 and the downlink data 60 may be routed to the first downlink service flow 50. The packet classifiers 26 and 34 use rules, such as destination IP/Port address, QoS attributes (e.g. Tos (Type of Service), DSCP (Differentiated Service Code Point)) to classify the packets. There may be multiple classification rules for a service flow. As will be described hereinafter, the first service flows 44 and 50, according to the various embodiments of the present invention, also may include VoIP signaling.

The BWA system 10, according to various embodiments of the present invention, includes control plan protocols and procedures for supporting VoIP services. More specifically the following is described: VoIP service deployment scenarios, including provisioning and accounting; ways to provide the service flows with differentiated QoS when a VoIP call is initiated; and release the service flows when the VoIP call is terminated. With respect to VoIP services, it is desirable to provide the maximum number of VoIP calls in a cell with good voice quality. Therefore, the bandwidth allocation/deallocation scheme for VoIP calls may be a significant feature in meeting bandwidth efficiency and voice quality goals. The easiest approach may be to use DSA/DSD messages for this purpose. However, using DSA/DSD on per call basis may have the following major issues: The BS may not have a way of knowing how many MSs will send the DSA message for initiating a VoIP call at any given time, as the MS roams from BS to BS. So, the BS may not be able to optimally plan the bandwidth allocation for voice and data services. As the result the VoIP services may not be guaranteed, since many calls may be rejected due to insufficient bandwidth. Significant delay may occur during the call setup, since each DSA request has to be forwarded to the home AAA server for authorization. The delay may be even longer when the MS roams to the foreign networks. It may add complexity to BS scheduling in order to process DSA/DSD messages on per call basis.

The BWA system 10, according to the various embodiments of the present invention, deploys VoIP over WiMAX by using a two service flow procedure initiated by the BS 12. With respect to the uplink flows, the two service flows include the first and second uplink service flows 44 and 46 and, with respect to the downlink flows, the two service flows include the first and second downlink service flows 50 and 52. In the BWA system 10, according to the various embodiments of the present invention, the second uplink and downlink service flows 46 and 52 are selected from UGS, rtPS or ertPS. In some embodiments, the first uplink and downlink service flows 44 and 50 may be selected from nrtPS or BE. The VoIP signaling of the first service flows 44 and 50 may include call control messages, such as the SIP signals hereinafter described with request to FIGS. 8, 9, 11 and 12. As will be described in more detail with respect to FIG. 2, the BS 12 sends a DSA-Request (DSA-REQ) message to create the first service flows 44 and 50 for VoIP signaling, with the first service flows each being in an Active State. Thereafter, if the BS can support the second service flows 46 and 52 for the VoIP call connections, the BS 12 sends a DSA-REQ message to create the second service flows. As will be described hereinafter, the second service flows 46 and 52, upon being set up, are each in an Admitted State, which means that the bandwidth for the VoIP services have been reserved, but not yet granted to a VoIP call.

The BWA system 10, according to the various embodiments of the present invention, utilizes the two-phase call control procedure for VoIP services, which includes Phase I for bandwidth reservation and Phase II for bandwidth activation. Prior to Phase I, the service flow may be instantiated and its Provisioned QoSParamSet may be set to include a provisioned bandwidth that may be subsequently reserved during Phase I, as will be described hereinafter. As one possibility, the amount of the provisioned bandwidth may be set by a network management system (not shown). As another possibility, the provisioned bandwidth may be negotiated between the BS 12 and the MS 14 prior to or during connection setup. Although providing the instantiated second service flow may be characterized as having a Provisioned State, achieving this instantiation stage sometimes may be referred to as "pre-provisioning" the second service flows for the MS 14 that subscribes to the VoIP services. With this nomenclature, subsequent reservation of the bandwidth sometimes may be referred to as being part of "provisioning".

In Phase I for bandwidth reservation, when the MS 14 enters the cell of BS 12, the BS 12 reserves the bandwidth for the second service flows 46 and 52 for the VoIP services. The service flows are changed to the Admitted State (the QoS parameter state is set to Admitted), as will be described in detail hereinafter with respect to FIG. 6. In Phase II for bandwidth activation, when a VoIP call is initiated, the QoS parameter state is set to Active, and the bandwidth (reserved bandwidth allocation), as specified in the maximum sustained traffic rate parameter, is granted for the VoIP call. For bandwidth deactivation, when the VoIP call is terminated, the QoS parameter state is changed to the Admitted State. Additionally, a Usage Data Record (UDR) for VoIP services is generated, which includes (a) the duration of second service flows that have been reserved and (b) the number of bytes that have been transported during the duration of the call.

Figure 2:
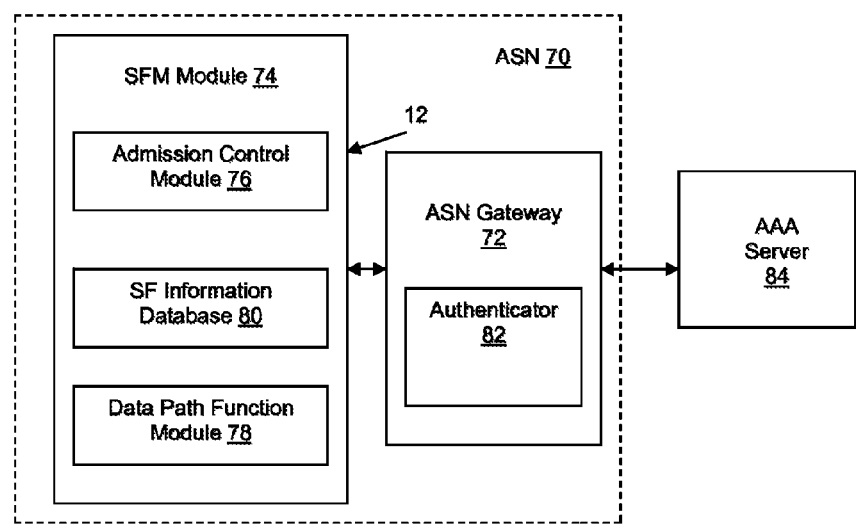
FIG. 2 is a block diagram of an Access Service Network (ASN) incorporating the base station of BWA system of FIG. 1, according to various embodiments of the present invention.

Referring to FIG. 2, the BS 12 of the BWA system 10 of FIG. 1 is shown as being part of an ASN 70, with some of the functions of the software of the MAC layer for the BS 12 being illustrated, according to various embodiments of the present invention. The ASN 70 also includes an ASN gateway (ASN GW) 72 coupled to the BS 12. The BS 12 is illustrated as including a Service Flow Management (SFM) module 74. In some embodiments, the SFM module 74 may include the following components: an admission control module 76, a data path function module 78, and a service flow information (SF info) database 80 coupled to the admission control module 76 and to the data path function 78. However, the functions of these modules, all of which reside in the MAC layer of the BS 12, may be grouped differently and called by different names. As one example, the SFM module 74 a part of the MAC/PHY 36 of the BS 12 of FIG. 1. In some embodiments, the ASN gateway 72 may include an authenticator 82. The ASN gateway 72 may be coupled to an AAA server 84 or alternatively coupled to an AAA proxy server, which in turn may be connected to an AAA server. The AAA server 84 may be a home CSN, as previously described.

In some embodiments, every change to the previously-described service flow QoS Parameters may be approved by the SFM module 74. This includes every DSA-REQ message to create a new service flow and every DSC-REQ message to change a QoS Parameter Set of an existing service flow. Such changes may include requesting an admission control decision (e.g., setting the AdmittedQoSParamSet) by the admission control module 76 and requesting activation of a service flow (e.g., setting the ActiveQoSParamSet) by the data path function module 78. Reduction requests regarding resources may also be checked by the admission control module 76.

The data path function module 78 may make the requests to the admission control module 76. The data path function module 78 also may transmit and receive DSA, DSC, and DSD messages to a WiMax Connection control module (described hereinafter). The data path function module 78 also may include what is referred to as the "BS scheduler", which primarily may be used to schedule the bandwidth grant for the service flows, including the previously described first and second service flows. In general, based upon a number of factors, the BS scheduler may select the data for transmission in a particular bandwidth. By specifying a scheduling service and its associated QoS parameters, the BS scheduler can anticipate the throughput and latency needs of the uplink traffic and provide polls and/or grants at the appropriate times. As will be described with respect to FIG. 3, in some embodiments, each MS 14 has its own first uplink service flow 44 for VoIP signaling and its own second uplink service flow 46 for VoIP call (connection for the VoIP packets) established by the BS 12.

Figure 3:
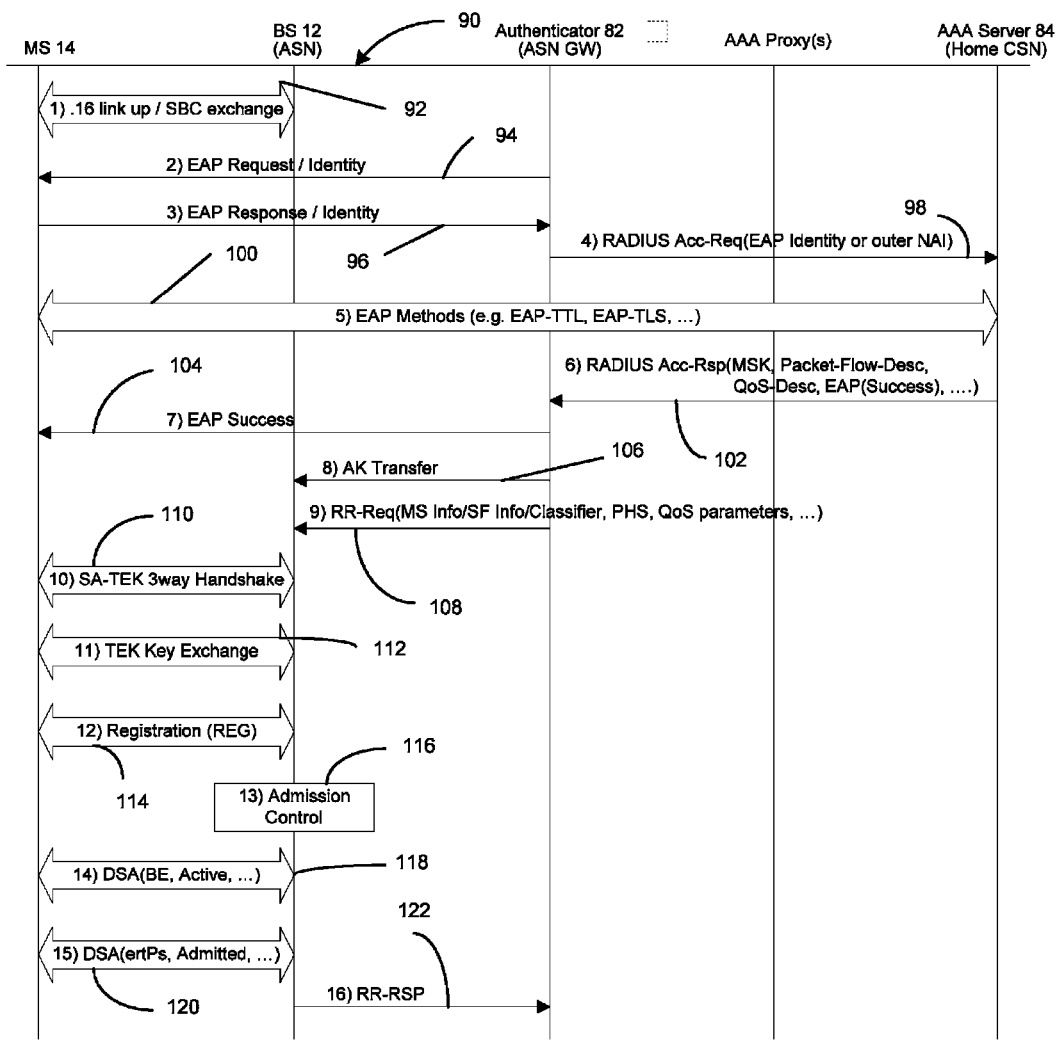
FIG. 3 is a signal diagram for providing active first service flows and admitted second service flows for a MS, according to various embodiments of the present invention.

Referring primarily to FIG. 3, with some references to FIGS. 1 and 2, there is illustrated a VoIP service flow provisioning and reservation procedure 90, according to some embodiments of the present invention. The procedure for reservation of second service flows for a VoIP call may be initiated when a MS 14 enters the network, e.g., a cell for the BS 12 in the BWA system 10 of FIG. 1. In an operation 92, the MS 14 may perform downlink (DL) acquisition, synchronization, and ranging, and exchanges subscriber basic capability (SBC) with the BS 12. In an operation 94, the authenticator 82 in ASN GW 72 may send an EAP-Identity Request that is encapsulated in the Private Key Management version 2 (PMKv2) EAP-Transfer message to the MS 14. In an operation 96, MS 14 may return the EAP-Identity Response that is encapsulated in the PMKv2 EAP-Transfer message to the authenticator 82. In an operation 98, the MS's EAP identity may be encapsulated in a RADIUS Access-Request (Req) message that is sent by the authenticator 82 to the home AAA server 84. In an operation 100, the EAP authentication process may be performed between the MS 14 and the AAA server 84. In an operation 102, the EAP authentication process may be completed. In an operation 104, the AAA server 84 may send a RADIUS Access-Response (Rsp) message that contains the following parameters shown in Table I below.

TABLE I

| Parameter | Notes |
| --- | --- |
| MSK | The Master Session Key is passed to the AAA client upon successful EAP authentication. |
| Packet-Flow-Descriptor | Describes the VoIP service flows |
| QoS-Descriptor | Describes the "over the air" QoS parameters for VoIP service flows |

TABLE I-continued

| Parameter | Notes |
| --- | --- |
| EAP Message | EAP payload encapsulated in the RADIUS message |

In an operation 104, the authenticator 82 may send an EAP-Success that is encapsulated in the PMKv2 EAP-Transfer message to the MS 14. In an operation 106, the authenticator 82 may generate the PMK (pairwise master key) from MSK (master session key), and then AK (authentication key) from PMK based on the algorithms specified in IEEE 802.16e Recommendation. The authenticator 82 may send the AK to the BS. In an operation 108, the authenticator may send an RR-Req message that contains the following parameters in Table II.

TABLE II

| Parameters | Notes |
| --- | --- |
| MS Info | Describes the MS information |
| >SF Info | Describes the VoIP service flows |
| Packet Classification Rules | Describe the classification rules for VoIP service flows. |
| QoS Parameters | Describe the "over the air" QoS parameters for VoIP service flows. |
| PHS Rules | Describe the PHS rules for VoIP service flows. |

In an operation 110, BS 12 and MS 14 may conduct the PMKv2 3-way handshake (SA-TEK-Challenge/Request/Response exchange) to establish the security association(s) for the pre-provisioned service flows. In an operation 112, BS 12 and MS 14 may conduct the TEK (traffic encryption key) keys exchange using PMKv2 Key-Request/Reply messages. In an operation 114, MS and BS may conduct the MS registration using the Registration (REG) message.

In an operation 116, the SFM module 74 (e.g., admission control module 76) of the BS 12 may implement admission control to determine if the VoIP service flow of the MS 14 that has entered the network (e.g., cell of the BS 12) can be supported. If the admission control module 76 determines that the VoIP service flow can be supported, then it generates an admit signal. In an operation 118, upon being authorized by the SFM module 74 (e.g., admission control module 76), the SFM module 74 (e.g., data path function module 78) of the BS 12 sends a DSA-REQ message to create the previously-described first uplink (UL) and downlink (DL) service flows 44 and 50 of FIG. 1. The first service flows 44 and 50 of FIG. 1 are used for VoIP signaling, which may be provided to and from a SIP agent (see FIGS. 4 and 5), respectively. The first service flows also may be used for other data (see data 58 of FIG. 1). The first service flows are set to be in the Active State (e.g., setting the ActiveQoSParamSet to be non-null), without the need for transitioning through the Admitted State.

In an operation 120, if the BS 12 can support the second UL and DL service flows 46 and 52 of FIG. 1 for the VoIP call connection (e.g., the data path function module 78 receives the admit signal), then the BS 12 (e.g., the data path function module 78) sends DSA-REQ messages to create the second service flow 46 and 52 for VoIP call (call's VoIP packets). The second service flows 46 and 52 are set to be in the Admitted State (e.g., setting the AdmittedQoSParamSet to be non-null), which means that the bandwidth is reserved, but not yet granted. In an operation 122, BS 12 may send a RR-RSP message to the authenticator 82.

In one embodiment, the first service flows for VoIP signaling may be established based upon authorization by the admission control module 76 without its establishment being conditioned upon whether the admission control module 76 authorizes the second service flows for the VoIP call connection. In another embodiment, both the establishment of the first service flows for VoIP signaling and the establishment of the second service flows for VoIP call connection may be made contingent upon the admission control module 76 determining that the BS 12 can support the second service flows.

Figure 4:
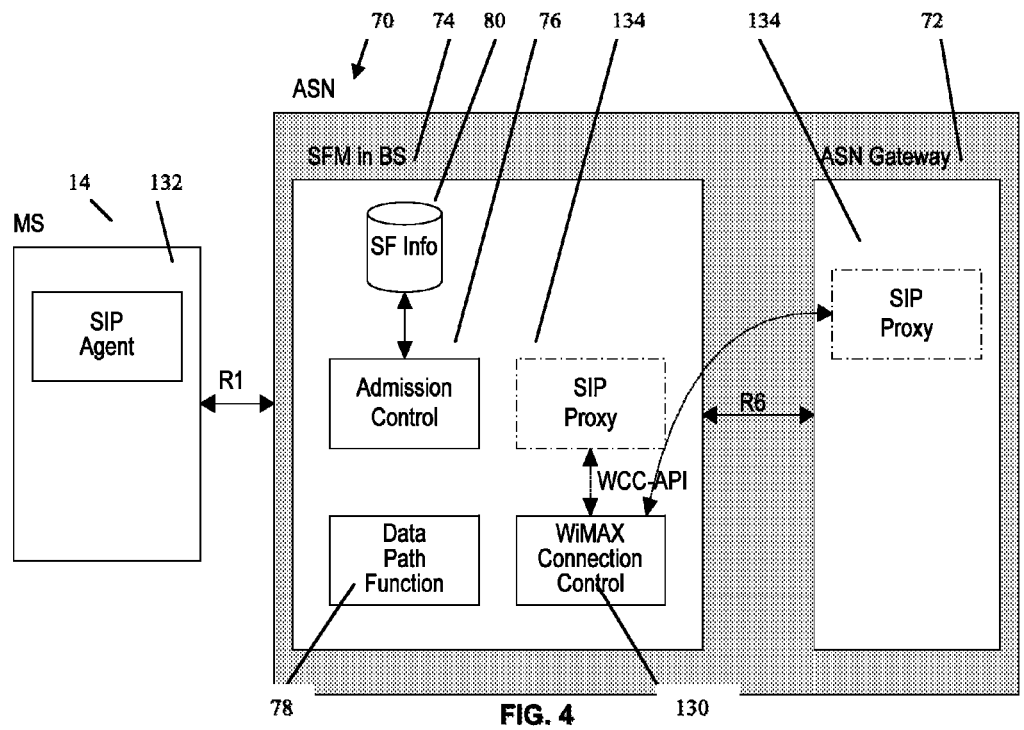
FIG. 4 is a block diagram the ASN incorporating the base station of FIG. 1, according to various embodiments of the present invention, in which an ASN mode trigger is illustrated.
Figure 5:
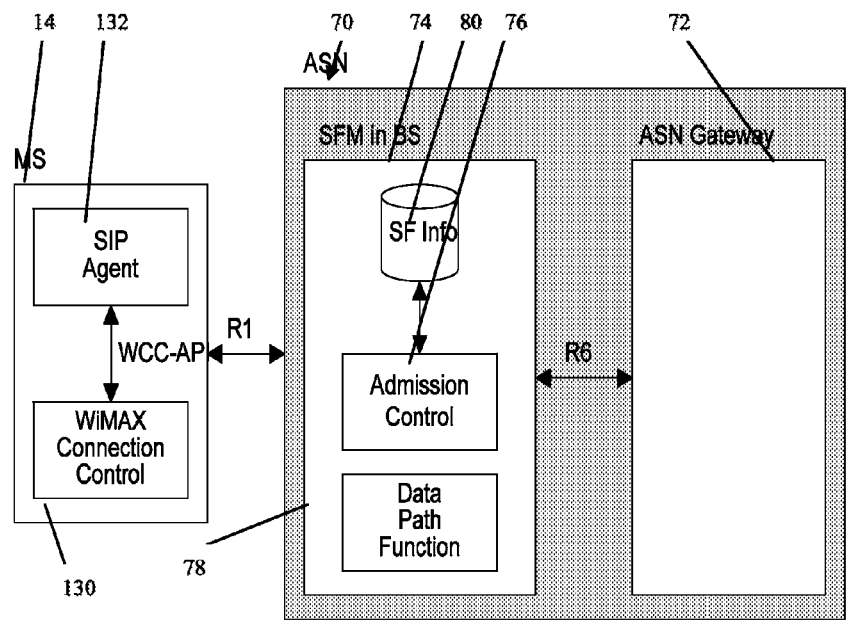
FIG. 5 is a block diagram the ASN incorporating the base station of FIG. 1, according to various embodiments of the present invention, in which a MS mode trigger is illustrated.

FIGS. 4 and 5 are directed toward two trigger models that enable VoIP applications to activate or deactivate the second uplink and downlink service flows 46 and 52 of FIG. 1 on a per call basis. The two trigger modes include an ASN trigger mode and a MS trigger mode that correspond to the trigger points in ASN 70 and MS 14, respectively. The following discussion will primarily focus on the activating and deactivating the second uplink service flow 46, with the second downlink service flow 52 generally being activated or deactivated with the second uplink service flow 46.

Referring to FIG. 4, the ASN 70 of FIG. 2, according to some embodiments of the present invention, is directed toward implementing the ASN trigger mode. In these embodiments, the SFM module 74 of the BS 12 may have a new component, a WiMAX connection control (WCC) module 130 (also referred to as a "connection control module"). In some embodiments, communications with the rest of the MAC layer of the BS 12 may be primarily to and from the data path function module 78 (e.g., exchange of DSA and DSC request and response messages). The MS 14 is further illustrated to show a SIP agent 132. In these embodiments, the ASN 70 may include a SIP proxy module 134 located either in the SFM module 74 of the BS 12 or in the ASN gateway 72. The SFM module 74 is part of the MAC layer of BS 12. The identifier R1 refers to wireless medium (air interface) 16 of FIG. 1 and the identifier R6 refers to a communication link between the SFM module 74 and the ASN gateway 72. In summary, for the ASN trigger mode, the WCC module 130 is located in the ASN 70.

Figure 8:
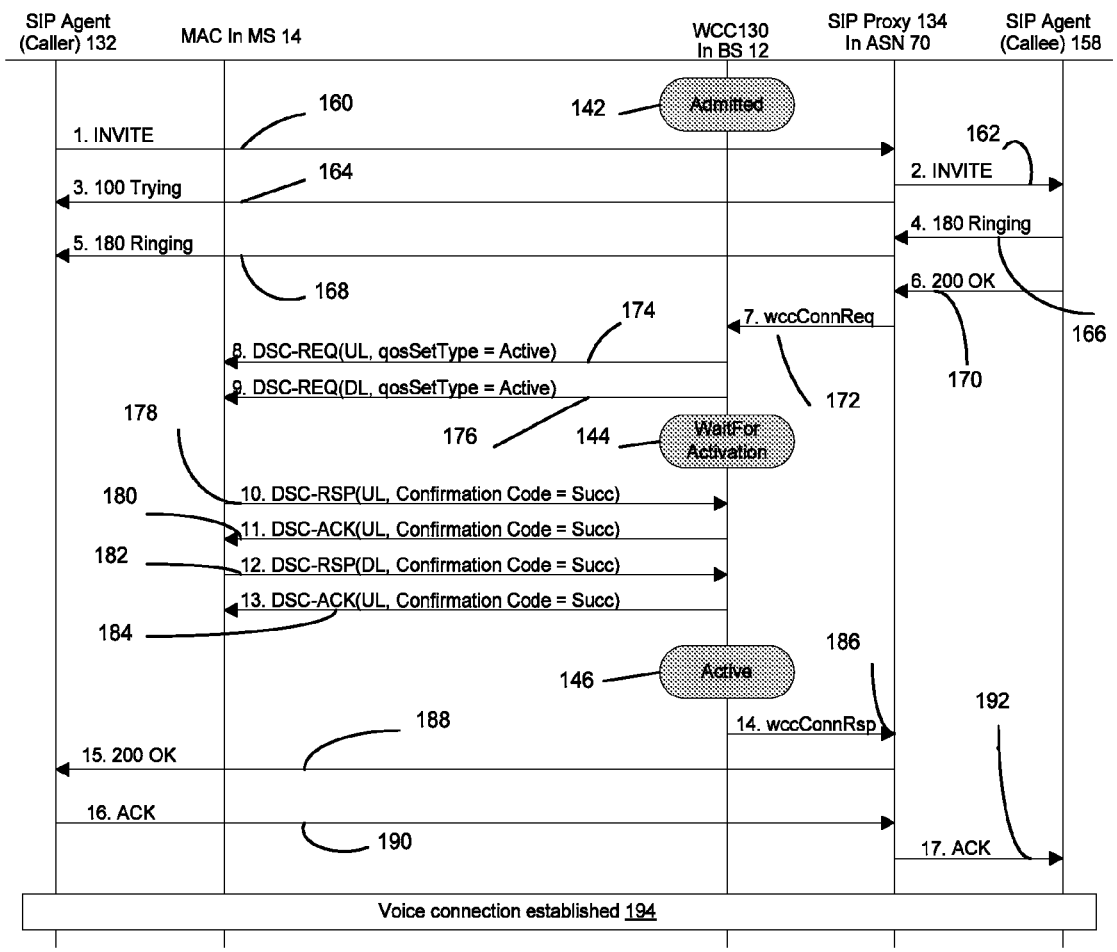
FIG. 8 is a signal diagram for a call setup procedure using the ASN trigger mode, according to one embodiment of the present invention.
Figure 9:
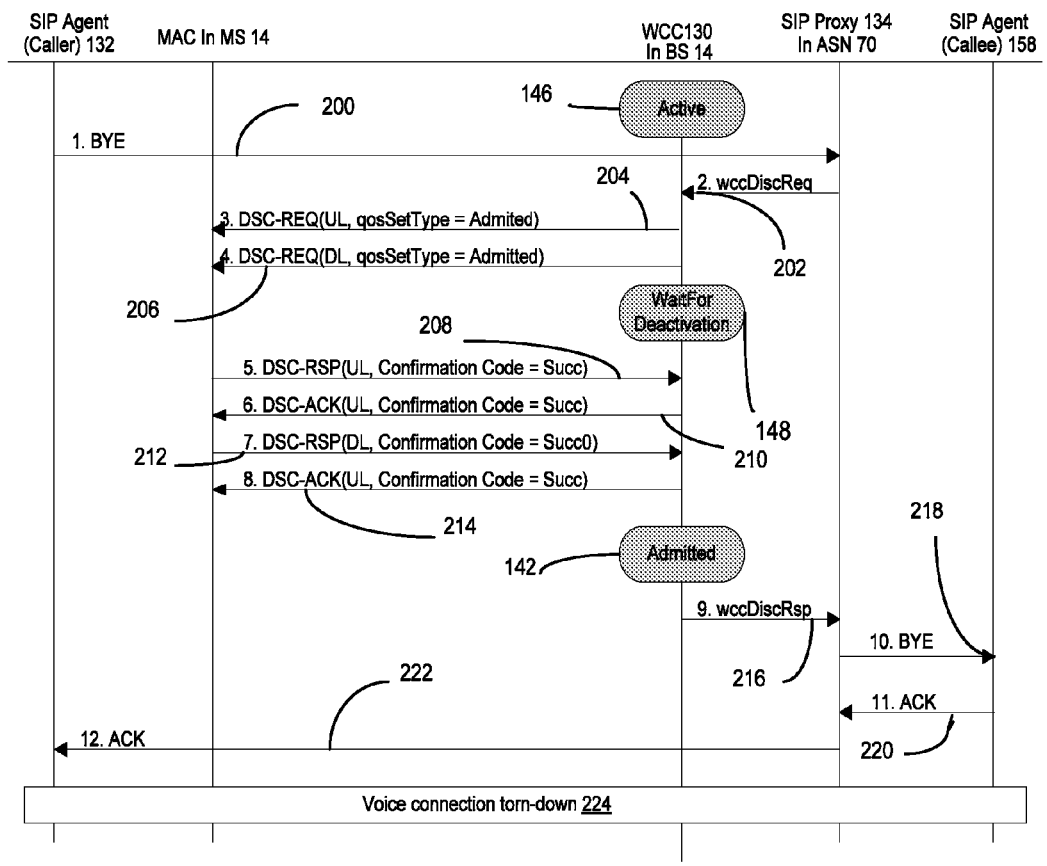
FIG. 9 is a signal diagram for a call tear-down procedure using the ASN trigger mode, according to one embodiment of the present invention.

In general, the WCC module 130 is responsible for mapping the VoIP streaming with a WiMAX service flows. The WCC module 130 is responsible for the activation or deactivation of VoIP service flows on behalf of the MS 14. Likewise, the SIP proxy module operates on behalf of the SIP Agent 132 of the MS 14. The SIP proxy module 134 plays both a SIP server and a SIP client role. When acting as a SIP server, the SIP proxy module 134 may receive SIP signaling messages from the SIP agent 132 in the MS 14. The SIP proxy module 134 may ask the WCC module 130 to activate or deactivate VoIP service flows 44 and 46 of FIG. 1 in response to the SIP signaling messages. When acting as the SIP client, the SIP proxy module 134 may forward the SIP signaling messages to the SIP server (not shown) in the network. The SIP Proxy module 134 may interface with the WCC module 130 via the WCC-Application Interface (API) to be described hereinafter. VoIP call flow examples for the ASN Trigger Mode are shown in FIGS. 8 and 9, which further describes the WCC protocol and it's interaction with the SIP proxy 134.

Figure 11:
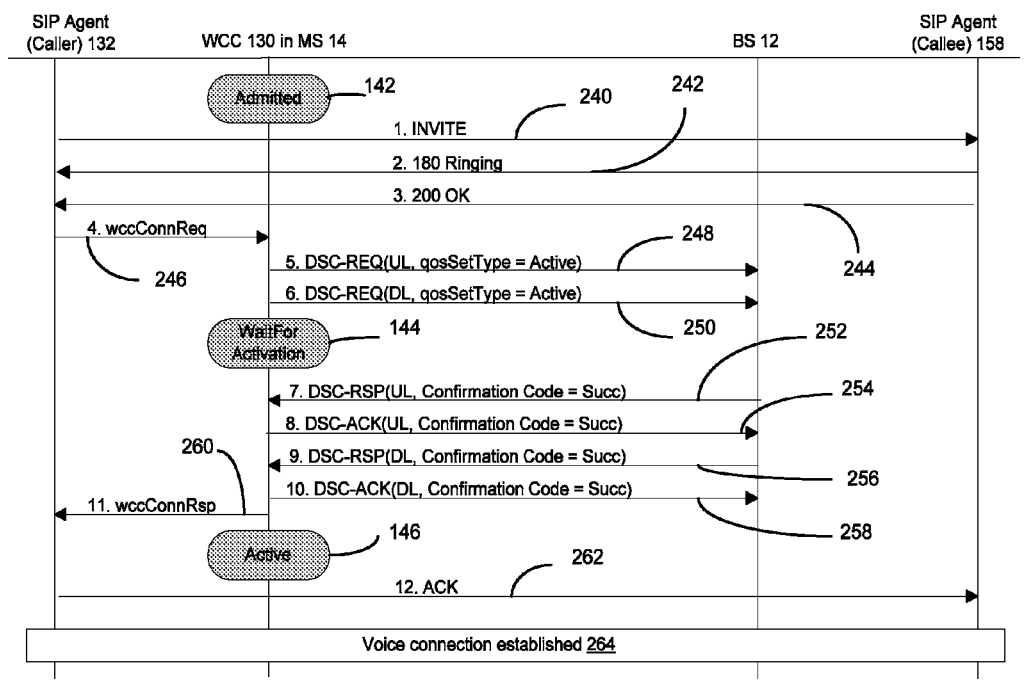
FIG. 11 is a signal diagram for a call setup procedure using the MS trigger mode, according to one embodiment of the present invention.
Figure 12:
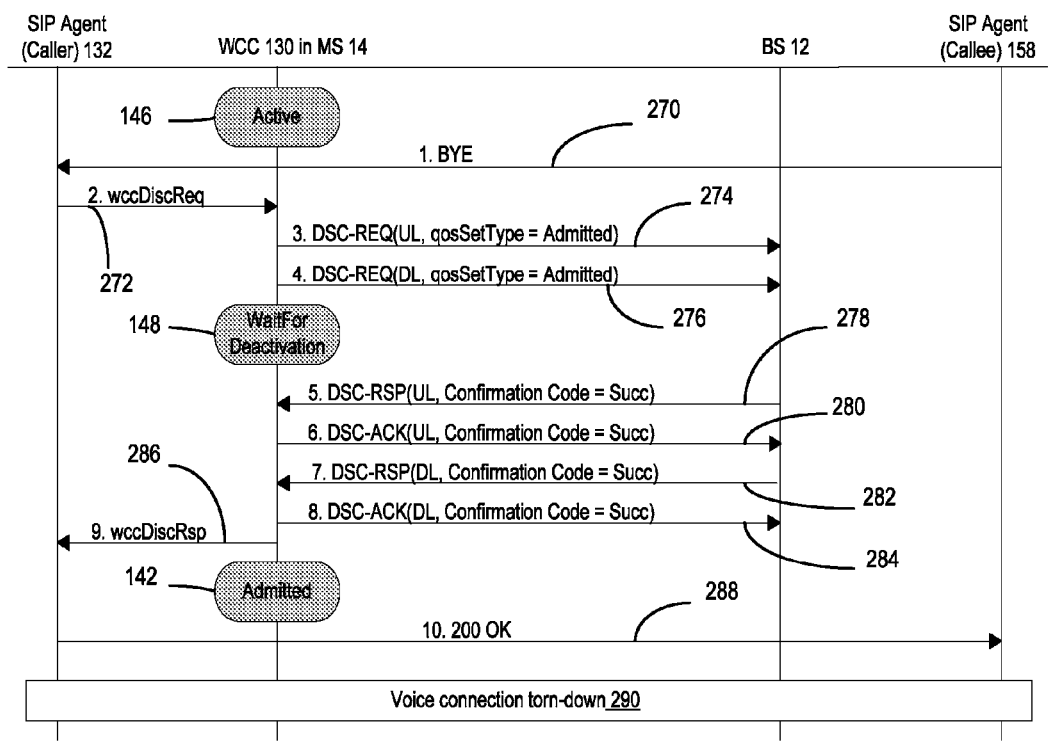
FIG. 12 is a signal diagram for a call tear-down procedure using the MS trigger mode, according to one embodiment of the present invention.

Referring to FIG. 5, the MS 14 of FIG. 2, according to some embodiments of the present invention, is directed toward implementing the MS trigger mode. Many of the components of FIG. 5 are the same as FIG. 4; hence, they will retain the same reference numbers and will not be described again. In these embodiments, the previously described WCC module 130 may be located in the MS 14 and may be in direct communication with the SIP agent 132, thereby eliminating the need for a SIP proxy module. The WCC module 130 may perform the same function as the one in the ASN trigger embodiment of FIG. 4. A VoIP call flow example for the MS Trigger Mode is shown in FIGS. 11 and 12, which describes the WCC protocol in more detail.

A comparison of the two trigger modes is provided in Table III below:

TABLE III

| Trigger Modes | Characteristics | Note |
|---|---|---|
| ASN Gateway | SIP proxy at the ASN GW needs to map MS's IP address to the VoIP service flows<br>Need to define the WCC-API over R6 interface | These modes are transparent to the MS<br>It can support standard SIP applications (e.g. Skype) transparently<br>It is suitable for handheld or |
| ASN BS | SIP Proxy at the BS needs to map MS's IP address to the VoIP service flows | UMD client that has limited processing power |
| MS | If WCC module is implemented in the MS, then WCC-API has to be supported on a PCI interface | This mode is transparent to the BS or ASN. Hence, it may not cause interoperability issues when the MS roams to a different BS.<br>This is suitable for CPE (Customer Premise Equipment) or NB (NoteBook) client |

With respect to FIGS. 4 and 5, the WCC API interface of the WCC module 130 is defined as follows. With respect to the WCC API interface, the SIP proxy module 134 of FIG. 4 and the SIP agent 132 of FIG. 5 are generically referred to as the "call session module", since the exchanged messages (signals) with the WCC API are the same in FIGS. 4 and 5. Although SIP is used to implement the call session module, other call session protocols may be used. The WCC API in both FIGS. 4 and 5 may enable the SIP application to activate or deactivate VoIP service flows, using the following messages: (a) wccConnReq—a connection request message from the call session module (SIP proxy module 134 of FIG. 4 or SIP agent 132 of FIG. 5) to connect a VoIP streaming to a VoIP service flow; (b) wccConnRsp—a connection response message to wccConnReq; (c) wccDiscReq—a disconnection request message from the call session module (SIP proxy module 134 of FIG. 4 or SIP agent 132 of FIG. 5) to disconnect a VoIP streaming to a VoIP service flow; and (d) wcc-DiscRsp—a response message to wccDiscReq.

The WCC module 130 also may have a MAC API that uses IEEE 802.16 MAC messages to control service flows. In some embodiments, the following IEEE 802.16 messages may used by the WCC module 130: (a) DSA-REQ (dynamic service addition Request)—request to create a service flow; (b) DSA-RSP (dynamic service addition Response)—response to DSA-REQ; (c) DSC-REQ (dynamic service change Request)—request to change service flow attributes; (d) DSC-RSP (dynamic service change Response)—response to DSC-REQ; (e) DSD-REQ (dynamic service deletion Request)—request to delete a service flow; and (f) DSD-RSP (dynamic service deletion Response)—response to DSD-REQ.

Figure 6:
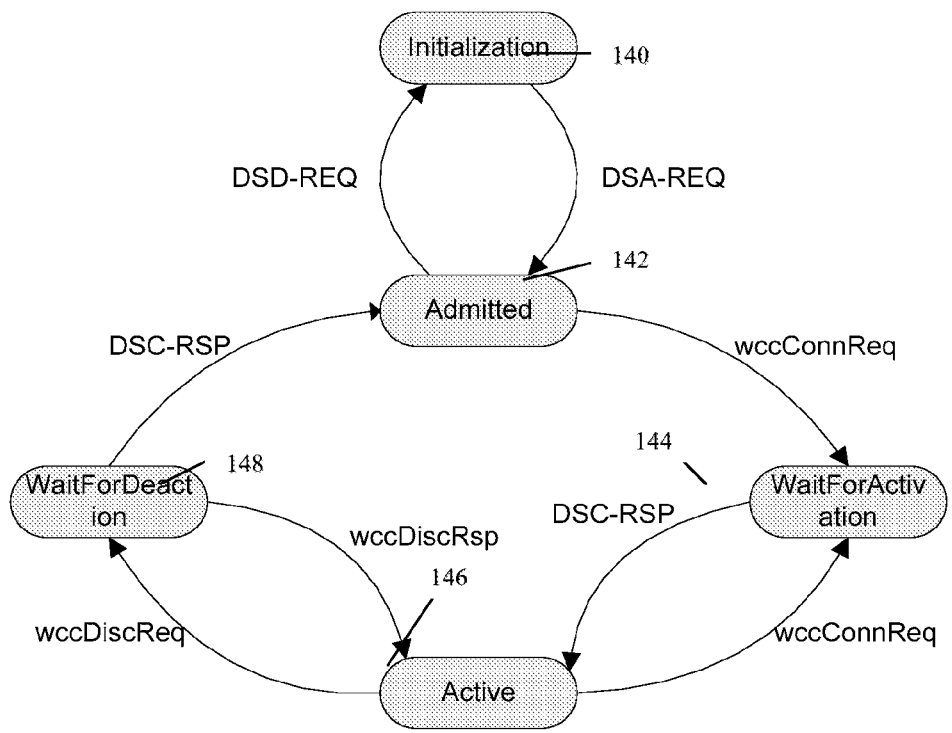
FIG. 6 is a state transition diagram for a WIMAX Connection Control (WCC) module, according to various embodiments of the present invention.

Referring to FIG. 6, a state transition diagram is provided for WCC module 130 of FIGS. 4 and 5, according to the various embodiments of the present invention, using the above-described API messages or signals. Additionally, this state transition diagram provides an overview of the diagrams of FIGS. 7-12 to be presented hereinafter. This diagram of FIG. 6 has the following states: (a) Initialization State 140— initial state after power-up or reset; (b) Admitted State 142—resources such as UL/DL service flow, have been reserved (allocated), but not yet activated (i.e. no active VoIP calls); (c) WaitForActivation State 144—waiting for BS response on service flow activation; (d) Active State 146—there is at least one active VoIP call; and (e) WaitForDeactivation State 148—waiting for BS response on service flow deactivation.

The Admitted State corresponds to the Phase I of the two-phase call control procedure described above. While in the Initialization State 140, the BS may send to the WCC module a non-solicited DSA-REQ message requesting that it provide a reserved bandwidth allocation for some number of VoIP calls. Upon responding with a DSA-RSP message (not shown) to the BS, the WCC module may transition from the Initialization State 140 to the Admitted State 142. The WCC module may transition from the Admitted State 142 back to the Initialization State 140 when the BS sends the DSD-REQ message to delete the service flows. Upon receiving a wccConnReq message from the call-session module, the WCC module may send a DSC-REQ message to the BS and may transition from the Admitted State to the WaitForActivation State 144. Upon receiving a DSD-RSP message from the BS, the WCC module may transition from the WaitForActivation State 144 to the Active State 146. Active State 146 corresponds to Phase II of the two-phase call control procedure described above in that there now is an Active VoIP call. When a VoIP call is terminated by the WCC module receiving a wccDiscReq message from the call-session module, then the WCC module may transition from the Active State 146 to the WaitForDeactivation State 148, where the WCC may send a DSC-REQ message to the BS. Upon receiving a DSC-RSP message from the BS, the WCC may transition to the Admitted State 142.

FIGS. 7 through 12 show various VoIP call flow examples for implementing the WCC state diagrams as described in FIG. 6, according to the various embodiments of the present invention. These examples show integration of the integration of SIP, WCC, and BS/MS MAC in order to provide VoIP services with differentiated service flows. These examples use an Adaptive Multi-Rate (AMR) codec (not shown) with the maximum bit rate of 12.2 Kbps. In these illustrative examples, it is assumed that the second service flows each need 25 Kbps maximum sustain rate, including all header overheads. The reference numbers of the States shown in FIG. 6 are used in FIGS. 7-12. With respect to FIGS. 7-9, a call flow example is illustrated for the ASN Trigger Mode described in FIG. 4. In this call flow example of ASN trigger Mode, the WCC module 130 of FIG. 4 located in the BS 12. The same call flow can be used for WCC module 130 residing in the ASN gateway 72. With respect to FIGS. 10-12, a call flow example is illustrated for the MS Trigger Mode described in FIG. 5. In this call flow example of MS trigger Mode, the WCC module 130 of FIG. 4 is located in the MS 14.

Figure 7:
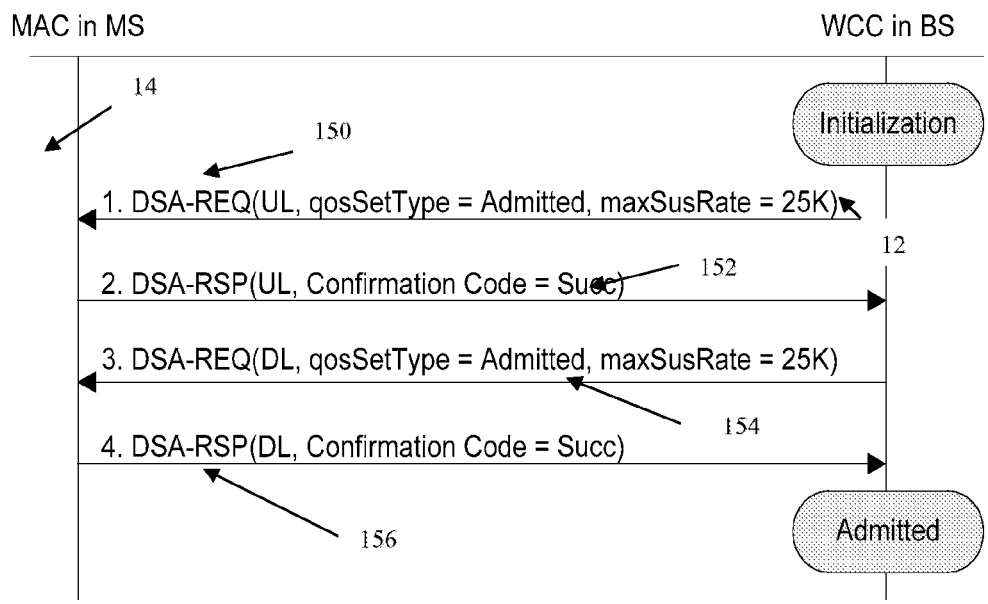
FIG. 7 is a signal diagram for providing the second service flows with a reserved bandwidth to a MS using an ASN trigger mode, according to various embodiments of the present invention.

Referring to FIG. 7, initialization of the WCC module 130 located in the BS is described, which basically corresponds to operation 120 of FIG. 3, wherein two service flows for Uplink (UL) and Downlink (DL) VoIP traffic are generated, and the QoS Parameter Set Type is set to "Admitted". The parameters, as shown in the DSA-REQ message, are not inclusive and may vary. More specifically, FIG. 7 illustrates the bandwidth reservation scenario in accordance with Phase I of the previously-described two-phase call control procedure. In IEEE 802.16, each service flow is unidirectional, so uplink and downlink service flows need to be set up separately. In this example, an illustrative 25 Kbps bandwidth may be reserved that a VoIP call. In particular, this shows providing reserved bandwidth allocations for the second UL and UD service flows 46 and 52 of FIG. 1, wherein the admission requests originate from the WCC module 130 in the BS 12 for allocating the BS's bandwidth so as to reserve the bandwidth for the MS 14.

The WCC module 130 starts in its Initialization State. First, in an operation 150, the BS sends a DSA-REQ message for the UL connection, with the qosSetType set to Admitted, and the Maximum Sustainable Rate (maxSusRate) set to 25 kbps. Second, in an operation 152, the WCC module 130 responses with a DSA-RSP message accepting this reserved bandwidth allocation in an operation 152, with the with CC=Succ. Third, in an operation 155, the BS sends a DSA-REQ message for the DL connection, with the qosSetType set to Admitted, and the Maximum Sustainable Rate (maxSusRate) set to 25 kbps. Fourth, in an operation 156, the WCC module 130 responses with a DSA-RSP message accepting this reserved bandwidth allocation, with CC=Succ.

Referring to FIGS. 4 and 8, a call setup flow with the SIP proxy module 134 of FIG. 4 is shown. With reference to FIG. 4, the headers to the diagram of FIG. 8 are as follows. The "SIP Agent" of the Caller is the SIP agent 132 of FIG. 4, the "MAC in the MS" is the MAC of MS 14 (e.g., MAC/PHY layer 28 of FIG. 1), the "WCC in BS" is the WCC module 130 in the BS 12 in FIG. 4, and the "SIP Proxy in ASN" is the SIP proxy module 134 in the ASN 70 of FIG. 4. Additionally, a SIP agent 158 for a Callee is shown. More specifically, this originating call setup starts with the WCC module 130 being in its Admitted State 142, as achieved in FIG. 7.

The first six operations 160-170 describe the SIP protocol to set up a VoIP call. In a first operation 160, a SIP INVITE message may be transmitted from the caller SIP agent 132 to the SIP proxy module 134. In a second operation 162, the SIP proxy module 134 may forward the INVITE to the callee SIP agent 158. In a third operation 164, a SIP 100 Trying signal may be sent from the SIP proxy module 134 to the caller SIP agent 132. In a fourth operation 166, a SIP 180 ringing signal may be sent from the callee SIP agent 158 to the SIP proxy module 134. In a fifth operation 168, the SIP proxy module 134 may pass on the SIP 180 ringing signal to the caller SIP agent 132. In a sixth operation 170, the callee SIP agent 158 may send a SIP 200 OK signal to initiate the establishment of a VoIP call.

In a seventh operation 172, in response to the SIP 200 OK (the callee SIP agent 158 answering the call), the SIP proxy module 134 may send a wccConnReq message to the WCC module 130 requesting bandwidth for a VoIP call. Additionally, the wccConnReq message includes the following parameters to map the VoIP streaming to service flows: (a) total bit rate in bytes; (b) voice packet duration in ms; (c) voice packet size in bytes; (d) source IP address and port number; and (e) destination IP address and port number.

In response to the wccConnReq message, in eighth and ninth operations 174 and 176, the WCC module 130 may send DSC-REQ messages to the MAC in MS 14 for the UL/DL, with the parameter set including qosSetType=active, after which the WCC module 130 may transition to its WaitForActivation state 144. More specifically, when the WCC module 130 sends the DSC-REQ messages, it sends the following parameters to activate UL/DL service flows for a VoIP call: (a) Service Flow Identification (SFID) (UL or DL); (b) QoS parameter Set Type="Active" (which indicates that the SF is active and the BS 12 will grant the MS 14 the bandwidth); and (c) parameters to configure the packet classifiers in SS and BS with the following rules so VoIP packets can be routed to the appropriate second service flow (illustrative parameters including IP destination address/port and IP Type of service/differentiated services codepoint (DSCP). After the sending of the DSC-REQ messages, the WCC module 130 may transition to its WaitForActivation State 148."

In a tenth operation 178, the MAC layer of the MS 14 may respond with DSC-RSP messages for UL, with a Conformation Code (CC) set to Success (Succ). In an eleventh operation 180, the WCC module 130 may respond by sending a DSC-ACK for the UL, with the CC set to Succ. Likewise, in a twelve operation 182, the MAC layer of the MS 14 may respond with DSC-RSP messages for DL, with a Conformation Code (CC) set to Success (Succ). In a thirteenth operation 184, the WCC module 130 may respond by sending a DSC-ACK for the DL, with the CC set to Succ. Thereafter, the WCC module 130 may transition to its Active State 146.

In a fourteenth operation 186, the WCC module 130 may send a wccConnRsp message to the SIP proxy module 134 to inform the SIP proxy module 134 that the service flows are ready for voice communication. Thereafter, the SIP protocol completes the call in operations 188-192. More specifically, in a fifteenth operation 188, the SIP proxy module 134 may send a SIP 200 OK signal to the caller SIP agent 132. In a sixteenth operation 190, the caller SIP agent 132 may send an SIP acknowledgment (ACK) to the SIP proxy module 134 and in a seventeenth operation 192, the SIP proxy module 134 may send the ACK to the callee SIP agent 158, after which a voice connection is established at 194.

With respect to operation 172, this operation means that the bandwidth will be activated, and the MS 14 will be charged for the data usage during the VoIP call. The previously described Usage data record (UDR) may capture the billing record for VoIP subscribers (MSs 14) that may be charged for the duration of VoIP bandwidth reserved and the actual data usage. In general, the data path function module 78 may manage the accounting for the UDR and store the UDR in the SF information database 80. In some embodiments, the UDR for VoIP services includes: (a) the duration of the second service flows (UGS, rtPS or ertPS service flows) that have been reserved; and (b) the number of bytes that have been transported in the duration of the VoIP call.

Referring to FIGS. 4 and 9, there is illustrated a call release flow is shown in FIG. 9 with the SIP proxy module 134 of FIG. 4, again for the ASN trigger mode. In a first operation 200, the caller SIP agent 132 may send a SIP BYE message to the SIP proxy module 134 to release the VoIP call. In a second operation 202, the SIP proxy module 134 may respond by sending a wccDiscReq message to the WCC module 130 with the following parameters to disconnect the VoIP UL/DL service flows: (a) source IP address and port number; and (b) destination IP address and port number. In third and fourth operations 204 and 206, the WCC module 130 may respond to the wccDiscReq message by sending DSC-REQ messages with the following parameters to deactivate UL/DL service flows for a VoIP call: (a) SFID (UL or DL); (b) QoS parameter Set Type=Admitted (change the state to "Admitted" to indicate no active call); and (c) parameters to set the "classifier DSC action" parameter to DSC Delete Classifier (to delete the classifier rules previously been used for the call). After the sending of the DSC-REQ messages, the WCC module 130 may transition to its WaitForDeactivation State 148.

In fifth operation 208, the MAC in the MS 14 may respond to the UL DSC-REQ message by sending a DSC-RSP message for the UL, with the Confirmation Code (CC) set to Success (Succ). In a sixth operation 210, the WCC module 130 may respond by sending a DSC-ACK message for the UL, with the CC=Succ. Likewise, in seventh operation 212, the MAC in the MS 14 may respond to the DL DSC-REQ message by sending a DSC-RSP message for the DL, with CC=Succ. In an eighth operation 214, the WCC module 130 may respond by sending a DSC-ACK message for the DL, with the CC=Succ. Thereafter, the WCC module 130 may respond by transitioning to its Admitted State 142. In a ninth operation 216, the WCC module 130 may send wccDiscRsp to the SIP proxy module 134 to inform the SIP proxy module 134 that the service flows are deactivated.

In operations 218-222, the SIP protocol releases the call. In an tenth operation 218, the SIP proxy module 134 may respond by sending a SIP BYE message to the callee SIP agent 158, which in a eleventh operation 220 may send an ACK to the SIP proxy module 134. In a twelfth operation 222, the SIP proxy module 134 may send the ACK on to the caller SIP agent 132, which leads to the voice connection being torn down at 224.

Figure 10:
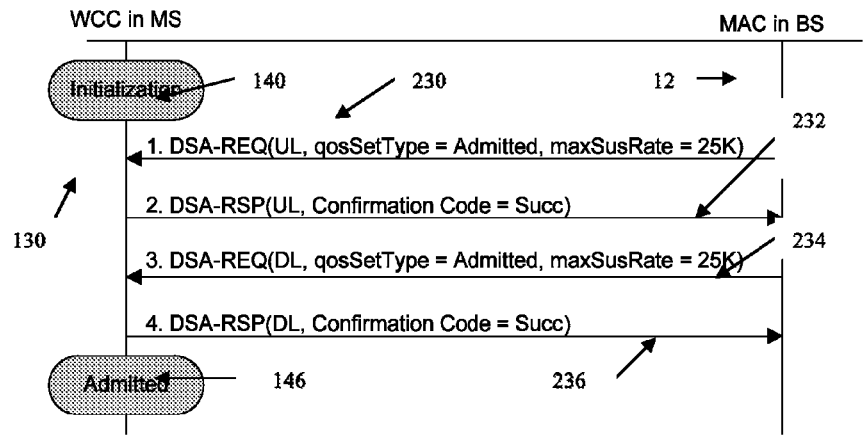
FIG. 10 is a signal diagram for providing the second service flows with a reserved bandwidth to a MS using an MS trigger mode, according to various embodiments of the present invention.

Referring to FIG. 10, there is illustrated call flow examples for the MS Trigger Mode, as shown in FIG. 5. In this example, the WCC module 130 is located in the MS 14. FIG. 10 depicts the initialization of the WCC module 130, which basically corresponds to operation 120 of FIG. 3, wherein two service flows for Uplink (UL) and Downlink (DL) VoIP traffic are generated, and the QoS Parameter Set Type is set to "Admitted". The parameters, as shown in the DSA-REQ message, are not inclusive and may vary. In this example, an illustrative 25 Kbps bandwidth may be reserved that a VoIP call. In particular, this shows providing reserved bandwidth allocations for UL/DL second service flows 46 and 52 of FIG. 1, wherein the admission requests originate from the MAC of BS 12 for allocating the BS's bandwidth so as to reserve the bandwidth for the MS 14. First, in an operation 230, the BS sends a DSA-REQ message for the UL connection, with the qosSetType set to Admitted, and the Maximum Sustainable Rate (maxSusRate) set to 25 kbps. Second, in an operation 232, the WCC module 130 responses with a DSA-RSP message accepting this reserved bandwidth allocation, with the CC=Succ. Third, in an operation 234, the BS sends a DSA-REQ message for the DL connection, with the qosSetType set to Admitted, and the Maximum Sustainable Rate (maxSusRate) set to 25 kbps. Fourth, in an operation 236, the WCC module 130 responses with a DSA-RSP message accepting this reserved bandwidth allocation, with CC=Succ.

Referring to FIGS. 5 and 11, a call setup flow with the SIP proxy module 134 of FIG. 4 is shown. This originating call setup scenario starts with the WCC module 130 being in its Admitted State 142, as achieved in FIG. 10. The first three operations 240-244 describe the SIP protocol to set up a VoIP call. In a first operation 240, a SIP INVITE message may be transmitted from the caller SIP agent 132 to the callee SIP agent 158. In a second operation 242, a SIP 180 ringing signal may be sent from the callee SIP agent 158 to the caller SIP agent 132. In a third operation 244, the callee SIP agent 158 may send a SIP 200 OK signal to the caller SIP agent 132 to initiate the establishment of a VoIP call. In a fourth operation 246, in response to the SIP 200 OK (the callee SIP agent 158 answering the call), the caller SIP agent 132 may send a wccConnReq message to the WCC module 130 in the MS 14 requesting bandwidth for a VoIP call. Additionally, the wccConnReq message includes the following parameters to map the VoIP streaming to service flows: (a) total bit rate in bytes; (b) voice packet duration in ms; (c) voice packet size in bytes; (d) source IP address and port number; and (e) destination IP address and port number.

In response to the wccConnReq message, in fifth and sixth operations 248 and 250, the WCC module 130 may send DSC-REQ messages to the BS 12 for the UL/DL, with the parameter set including qosSetType=active, after which the WCC module 130 may transition to its WaitForActivation state 144. More specifically, when the WCC module 130 sends the DSC-REQ messages, it sends the following parameters to activate UL/DL service flows for a VoIP call: (a) Service Flow Identification (SFID) (UL or DL); (b) QoS parameter Set Type="Active" (which indicates that the SF is active and the BS 12 will grant the MS 14 the reserved bandwidth); and (d) parameters to configure the packet classifiers in SS and BS with the following rules so VoIP packets can be routed to the appropriate second service flow (illustrative parameters including IP destination address/port and IP Type of service/differentiated services codepoint (DSCP). After the sending of the DSC-REQ messages, the WCC module 130 may transition to its WaitForActivation State 148.

In a seventh operation 252, the BS 12 may respond with DSC-RSP messages for UL, with the a Conformation Code (CC) set to Success (Succ). In an eighth operation 254, the WCC module 130 in the MS 14 may respond by sending a DSC-ACK for the UL, with the CC set to Succ. Likewise, in a ninth operation 256, the BS 12 may respond with DSC-RSP messages for DL, with CC=Succ. In a tenth operation 258, the WCC module 130 may respond by sending a DSC-ACK for the DL, with the CC set to Succ. In an eleventh operation 260, the WCC module 130 may send a wccConnRsp message to the caller SIP agent 132 that the service flows are ready for voice communication. Thereafter, the WCC module 130 may transition to its Active State 146. Thereafter, the SIP protocol completes the call. More specifically, in a twelfth operation 262, the caller SIP agent 132 may send a SIP ACK signal to the callee SIP agent 158, after which a voice connection is established at 264.

Referring to FIGS. 5 and 12, there is illustrated a call release flow is shown in FIG. 12 with the MS trigger mode described in FIG. 5. In a first operation 270, the callee SIP agent 158 may send a SIP BYE message to the caller SIP agent 132 to release the VoIP call. In a second operation 272, the caller SIP agent 132 may respond by sending a wccDiscReq message to the WCC module 130 in the MS 14 with the following parameters to disconnect the VoIP UL/DL service flows: (a) source IP address and port number; and (b) destination IP address and port number. In third and fourth operations 274 and 276, the WCC module 130 may respond to the wccDiscReq message by sending DSC-REQ messages with the following parameters to deactivate UL/DL service flows for a VoIP call: (a) SFID (UL or DL); (b) QoS parameter Set Type=Admitted (change the state to "Admitted" to indicate no active calls); (c) parameters to set the "classifier DSC action" parameter to DSC Delete Classifier (to delete the classifier rules previously been used for the call). After the sending of the DSC-REQ messages, the WCC module 130 may transition to its WaitForDeactivation State 148.

In fifth operation 278, the BS 12 may respond to the UL DSC-REQ message by sending a DSC-RSP message for the UL, with CC=success. In a sixth operation 280, the WCC module 130 may respond by sending a DSC-ACK message for the UL, with the CC=Succ. Likewise, in seventh operation 282, the BS 12 may respond to the DL DSC-REQ message by sending a DSC-RSP message for the DL, with CC=Succ. In an eighth operation 284, the WCC module 130 may respond by sending a DSC-ACK message for the DL, with the CC=Succ. In a ninth operation 286, the WCC module 130 may send wccDiscRsp to the caller SIP agent 132 to inform the SIP agent 132 that the service flows are deactivated. Thereafter, the WCC module 130 may respond by transitioning to its Admitted State 142. In operation 288, the SIP protocol releases the call by the caller SIP agent 132 sending a SIP 200 OK signal to the callee SIP agent 158, which leads to the voice connection being torn down at 290.

Figure 13:
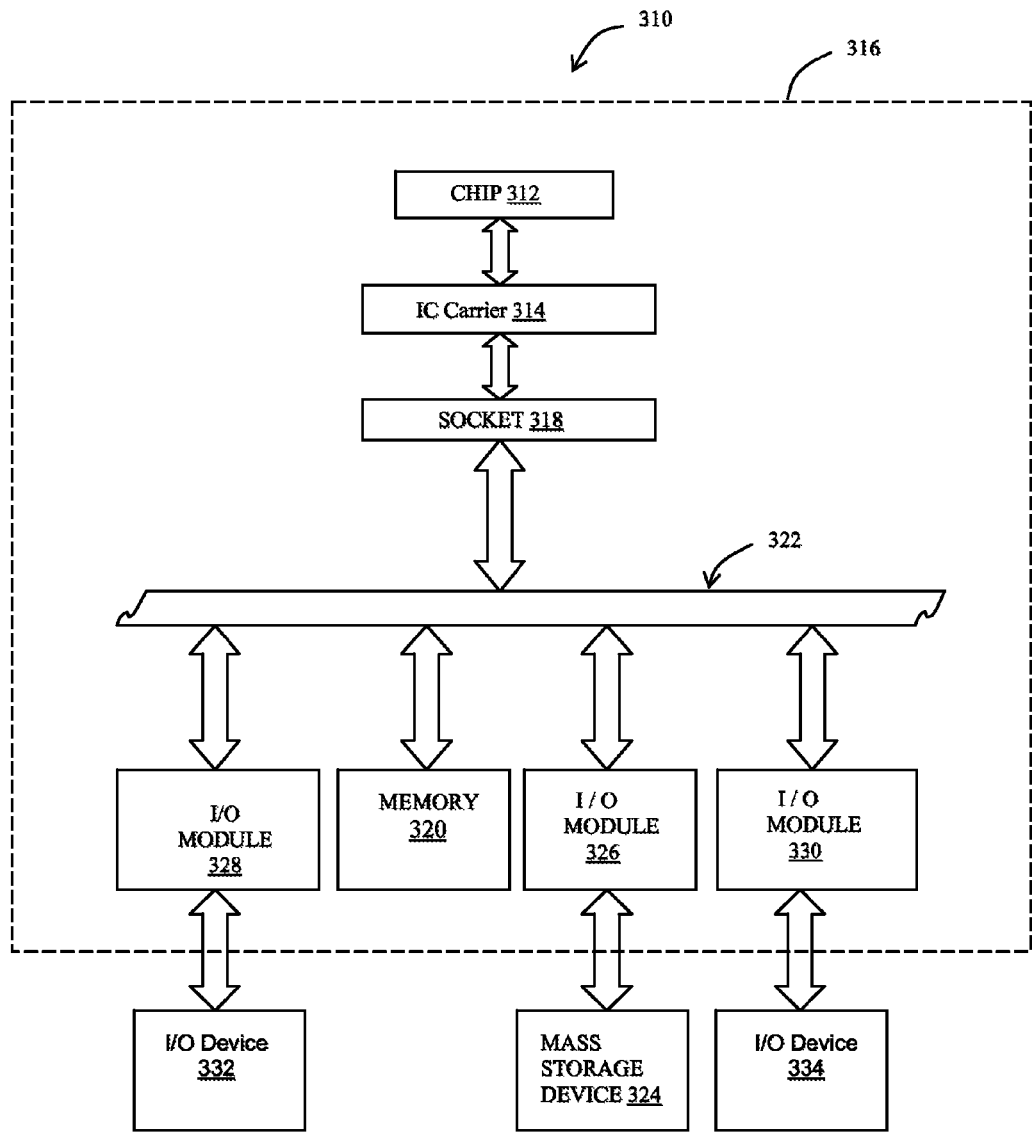
FIG. 13 is a block diagram of a mobile station system, incorporating various embodiments of the present invention.

Referring to FIG. 13, there is illustrated a system 310, which may be the MS 14 of FIG. 5 which incorporates WCC module 130. Examples of MS are a laptop or a UMD that has a mass storage device. The system may include a processor (integrated circuit chip) 312 and an IC chip carrier 314 for mounting the chip 312. The IC chip carrier 314 may be mounted on a substrate or printed circuit board (PCB) 316 via a socket 318. However, in other systems the IC carrier 314 may be directly coupled to the PCB 316. The PCB 316 may have mounted thereon a main memory 320 and a plurality of input/output (I/O) modules for external devices or external buses, all coupled to each other by a bus system 322 on the PCB 316. The system 310 may further include a mass storage device 324 coupled to the bus system 322 via an I/O module 326. In some embodiments, additional I/O modules 328 and 330 may be included for other external or peripheral I/O devices 332 and 334, respectively. The SIP agent 132 and the WCC module 130 may be software modules that are moved from the mass storage device 326 to the memory 318 for execution by the processor 312. Although the call session and WCC modules are shown as software modules, in other embodiments they may be hard-wired. Additionally, since the two-phase call control procedure is implemented in the MS 14, it may be transparent to the BS 12. Therefore, the inclusion of the two-phase call control procedure may create a value added service for the system 310 without causing any interoperability issue with the BS 12.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. An apparatus, comprising:

a service flow management module including an admission control module, a data path function module in communication with the admission control module and a connection control module in communication with the data path function module;

the data path function module being adapted to generate a first dynamic service addition (DSA) request message for a first uplink service flow in an active state to provide voice over internet protocol (VoIP) signaling;

the admission control module, in response to the admission control module determining that a second uplink service flow for a VoIP call can be supported, being adapted to generate an admit signal, with the first and the second uplink service flows being substantially in accordance with an Institute of Electrical and Electronic Engineers (IEEE) 802.16 standard;

the data path function module, in response to the admit signal, being further adapted to generate a second DSA request message for the second uplink service flow in an admitted state, with the second DSA message containing an amount of a reserved bandwidth for the VoIP call; and the connection control module being adapted to transition between a plurality of states based at least in part on DSA messages and/or dynamic service change (DSC) messages, the plurality of states including an initialization state, an admitted state, a wait-for-activation state, an activity state, and a wait-for-deactivation state.

2. The apparatus according to claim 1, wherein the second uplink service flow is a selected one of an unsolicited grant service flow, a real-time polling service flow, and an extended real-time polling service flow.

3. The apparatus according to claim 2, wherein the first uplink service flow is a selected one of a non-real-time polling service flow and a best effort service flow.

4. The apparatus according to claim 1, wherein the first and the second uplink service flows each is capable of being disposed both in the admitted state in which the service flow is reserved but not activated and in the active state in which the service flow is activated; the first DSA request message includes a first set type parameter which is set to the active state without previously having been set to the admitted state; and the second DSA request message has a second set type parameter set to the admitted state.

5. The apparatus according to claim 1, wherein the data path function module is further adapted to create a usage data record for the second uplink service flow, with the usage data record including a duration of the second uplink service flow and a number of bytes that have been transported during the VoIP call.

6. The apparatus according to claim 1, wherein the admission control module is further adapted to initiate the determining that the second uplink service flow can be supported in response to a mobile station entering a cell of the apparatus.

7. The apparatus according to claim 1, wherein the connection control module, in response to receiving the second DSA request message, is further adapted to send a DSA response message to the data path function module to confirm a need for the second uplink service flow.

8. The apparatus according to claim 7, wherein the connection control module, in response to receiving a connection request message for the VoIP call, is further adapted to send a DSC request message to the data path function module to activate the second uplink service flow for the VoIP call.

9. The apparatus according to claim 8, wherein the connection control module, after sending the DSC request message, is further adapted to receive a DSC response message from the data path function module indicating an activation of the reserved bandwidth.

10. The apparatus according to claim 9, wherein the service flow management module further includes a call session module, the call session module being in communications with the connection control module and adapted to generate the connection request message for the VoIP call.

11. The apparatus according to claim 10, wherein
the call session module, after generating the connection request message, is further adapted to generate a disconnection request message for the VoIP call; and
the connection control module, in response to the disconnection request message, is further adapted to send another DSC request message to the data path function module to deactivate the previously-activated reserved bandwidth and to receive another DSC response from the data path function module indicating a deactivation of the previously-activated reserved bandwidth.

12. The apparatus according to claim 11, wherein
the connection control module is further adapted to transition from the initialization state to the admitted state upon sending the DSA response message;
the connection control module is further adapted to transition from the admitted state to the wait-for-activation state upon sending the DSC request message;
the connection control module is further adapted to transition from the wait-for-activation state to the active state upon receipt of the DSC response message;
the connection control module is further adapted to transition from the active state to the wait-for-deactivation state upon sending the another DSC request message; and
the connection control module is further adapted to transition from the wait-for-deactivation state to the admitted state upon receiving the another DSC response message.

13. An apparatus, comprising:
a call session module adapted to receive a first uplink service flow in an active state for voice over internet protocol (VoIP) signaling and further adapted to generate a connection request message for a VoIP call;
a connection control module, coupled to the call session module, adapted to receive a dynamic service addition (DSA) request message for a second uplink service flow in an admitted state, with the DSA request message containing an amount of a reserved bandwidth; and
the connection control module, in response to the connection request message, further adapted to send a dynamic service change (DSC) request message to activate the second uplink service flow, with the first and the second uplink service flows being substantially in accordance with an Institute of Electrical and Electronic Engineers (IEEE) 802.16 standard, the connection control module further adapted to transition between a plurality of states based at least in part on DSA messages and/or DSC messages, the plurality of states including an initialization state, an admitted state, a wait-for activation state, an active state, and a wait-for-deactivation state.

14. The apparatus according to claim 13, wherein the second uplink service flow is a selected one of an unsolicited grant service flow, a real-time polling service flow, and an extended real-time polling service flow.

15. The apparatus according to claim 14, wherein the first uplink service flow is a selected one of a non-real-time polling service flow and a best effort service flow.

16. The apparatus according to claim 13, wherein the first and second uplink service flows each is capable of being disposed in the admitted state in which the service flow is reserved but not activated and the active state in which the service flow is activated; the first uplink service flow is in the active state and the second uplink service flow is in the admitted state.

17. The apparatus according to claim 13, wherein
the connection control module, in response to the DSA request message, is further adapted to send a DSA response message confirming a need for the second uplink service flow; and
the connection control module, after sending the DSC request message, is further adapted to receive a DSC response message indicating an activation of the second uplink service flow.

18. The apparatus according to claim 17, wherein
the call session module, after generating the connection request message, is further adapted to generate a disconnection request message for the VoIP call; and
the connection control module, in response to the disconnection request message, is further adapted to send another DSC request message to deactivate the previously-activated reserved bandwidth and to receive another DSC response indicating a deactivation of the previously-activated reserved bandwidth.

19. The apparatus according to claim 18, wherein
the connection control module is further adapted to transition from the initialization state to the admitted state upon sending the DSA response message;
the connection control module is further adapted to transition from the admitted state to the wait-for-activation state upon sending the DSC request message;

the connection control module is further adapted to transition from the wait-for-activation state to the active state upon receipt of the DSC response message;

the connection control module is further adapted to transition from the active state to the wait-for-deactivation state upon sending the another DSC request message; and the connection control module is further adapted to transition from the wait-for-deactivation state to the admitted state upon receiving the another DSC response message.

20. The apparatus according to claim 12, wherein the connection control module is further adapted to receive the DSA request message from a base station and to send the DSC request message to the base station.

21. An article comprising a non-transitory machine-readable medium that contains instructions of a service flow management program for a base station, which when executed by the base station, causes the base station to perform operations comprising:

providing a first uplink service flow in an active state for voice over internet (VoIP) signaling;

determining that a second uplink service flow for a VoIP call can be supported, with the first and the second uplink service flows being substantially in accordance with an Institute of Electrical and Electronic Engineers (IEEE) 802.16 standard;

in response to the determining that the second uplink service flow can be supported, reserving an amount of reserved bandwidth for the second uplink service flow;

activating the second uplink service flow in response to a connection request message for the VoIP call; and transitioning a connection control module between a plurality of state based at least in part on dynamic service addition (DSA) messages and/or dynamic service change (DSC) messages, the plurality of state including an initialization state, an admitted state, a wait-for-activation state, an active state, and a wait-for-deactivation state.

22. The article according to claim 21, wherein the second uplink service flow is a selected one of an unsolicited grant service flow, a real-time polling service flow, and an extended real-time polling service flow.

23. The article according to claim 22, wherein the first uplink service flow is a selected one of a non-real-time polling service flow and a best effort service flow.

24. The article according to claim 21, wherein the operations further comprise: creating a usage data record for the second uplink service flow, with the usage data record including a duration of the second uplink service flow and a number of bytes that have been transported during the VoIP call.

25. A mobile station system, comprising:

a memory, a mass storage device, and a processor coupled to each other;

a call-session module and a connection control module coupled to each other and each adapted to be stored in the mass storage device and to be moved to the memory by the processor, with the processor being adapted to execute the call-session module and the connection control module;

the call session module adapted to receive a first uplink service flow in an active state for voice over internet protocol (VoIP) signaling and further adapted to generate a connection request message for a VoIP call;

the connection control module adapted to receive a dynamic service addition (DSA) request message for a second uplink service flow in an admitted state, with the DSA request message containing an amount of a reserved bandwidth;

the connection control module, in response to the connection request message, further adapted to send a dynamic service change (DSC) request message to activate the second uplink service flow, with the first and the second uplink service flows being substantially in accordance with an Institute of Electrical and Electronic Engineers (IEEE) 802.16 standard; and the connection control module further adapted to transition between a plurality of states based at least in part on DSA messages and/or DSC messages, the plurality of states including an initialization state, an admitted state, a wait-for activation state, an active state, and a wait-for-deactivation state.

26. The mobile station system according to claim 25, wherein the uplink service flow is a selected one of an unsolicited grant service flow, a real-time polling service flow, and an extended real-time polling service flow.

27. The mobile station system according to claim 26, wherein the first uplink service flow is a selected one of a non-real-time polling service flow and a best effort service flow.

28. The mobile station system according to claim 27, wherein the first and the second uplink service flows each is capable of being disposed in an admitted state in which the service flow is reserved but not activated and an active state in which the service flow is activated; the first uplink service flow is in the active state and the second uplink service flow is in the admitted state.

29. The mobile station system according to claim 25, wherein the connection control module, in response to the DSA request message, is further adapted to send a DSA response message confirming a need for the second uplink service flow;

the connection control module, after sending the DSC request message, is further adapted to receive a DSC response message indicating an activation of the second uplink service flow; the call session module, after generating the connection request message, is further adapted to generate a disconnection request message for the VoIP call; and the connection control module, in response to the disconnection request message, is further adapted to send another DSC request message to deactivate the previously-activated reserved bandwidth and to receive another DSC response indicating a deactivation of the previously-activated reserved bandwidth.

30. The mobile station system according to claim 29, wherein the connection control module is further adapted to transition from the initialization state to the admitted state upon sending the DSA response message;

the connection control module is further adapted to transition from the admitted state to the wait-for-activation state upon sending the DSC request message;

the connection control module is further adapted to transition from the wait-for-activation state to the active state upon receipt of the DSC response message;

the connection control module is further adapted to transition from the active state the wait-for-deactivation state upon sending the another DSC request message; and the connection control module is further adapted to transition from the wait-for-deactivation state to the admitted state upon receiving the another DSC response message.

\* \* \* \* \*

UNITED STATES PATENT AND TRADEMARK OFFICE
CERTIFICATE OF CORRECTION

| | | |
|---|---|---|
| PATENT NO. | : 7,787,418 B2 | Page 1 of 1 |
| APPLICATION NO. | : 11/760103 | |
| DATED | : August 31, 2010 | |
| INVENTOR(S) | : Joey Chou | |

It is certified that error appears in the above-identified patent and that said Letters Patent is hereby corrected as shown below:

Column 16
Lines 42-43, "...the admission control module and a connection control module..." should read --...the admission control module, and a connection control module...--.

Column 16
Lines 67, "..., an activity state,..." should read --..., an active state,...--.

Column 18
Line 27, "..., a wait-for activation state,..." should read --...a wait-for activation state,...--.

Column 19
Line 34, "..., the plurality of state..." should read --..., the plurality of states...--.

Signed and Sealed this

Eleventh Day of September, 2012

David J. Kappos
*Director of the United States Patent and Trademark Office*